United States Patent
Tomioka et al.

(10) Patent No.: US 12,328,145 B2
(45) Date of Patent: Jun. 10, 2025

(54) OPTICAL TRANSMITTER AND CONTROL METHOD OF TUNABLE OPTICAL FILTER

(71) Applicant: Fujitsu Optical Components Limited, Kawasaki (JP)

(72) Inventors: Takeyasu Tomioka, Sapporo (JP); Shuichi Yasuda, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 814 days.

(21) Appl. No.: 17/580,234

(22) Filed: Jan. 20, 2022

(65) Prior Publication Data

US 2022/0294534 A1    Sep. 15, 2022

(30) Foreign Application Priority Data

Mar. 12, 2021 (JP) .................. 2021-039962

(51) Int. Cl.
*H04B 10/54* (2013.01)
*H04B 10/572* (2013.01)
*H04B 10/69* (2013.01)

(52) U.S. Cl.
CPC ........... *H04B 10/54* (2013.01); *H04B 10/572* (2013.01); *H04B 10/6911* (2013.01); *H04B 10/697* (2013.01)

(58) Field of Classification Search
CPC .. H04B 10/54; H04B 10/572; H04B 10/6911; H04B 10/697
See application file for complete search history.

(56) References Cited

U.S. PATENT DOCUMENTS

| 5,552,919 A | 9/1996 | Majima et al. |
| 2010/0142956 A1 | 6/2010 | Larikova et al. |
| 2017/0237500 A1 | 8/2017 | Nishimoto |
| 2020/0381895 A1* | 12/2020 | Yasuda ............... H04B 10/588 |

FOREIGN PATENT DOCUMENTS

| JP | 06-102555 A | 4/1994 |
| JP | 2017-147622 A | 8/2017 |

* cited by examiner

*Primary Examiner* — Leslie C Pascal
(74) *Attorney, Agent, or Firm* — STAAS & HALSEY LLP

(57) ABSTRACT

An optical transmitter includes an optical modulator, a tunable optical filter, a temperature sensor, and a processor. The tunable optical filter is provided on an output side of the optical modulator and transmits light of a frequency corresponding to a control voltage. The temperature sensor detects a temperature around the tunable optical filter. The processor detects an optical loss occurring in the tunable optical filter, calculates a width of a range of the control voltage in which the detected optical loss is smaller than a specified threshold, adjusts the control voltage based on the temperature detected by the temperature sensor, and shifts the control voltage by a specified amount that is larger than zero and smaller than or equal to a half of the calculated width of the range when the optical loss is larger than or equal to the threshold.

6 Claims, 14 Drawing Sheets

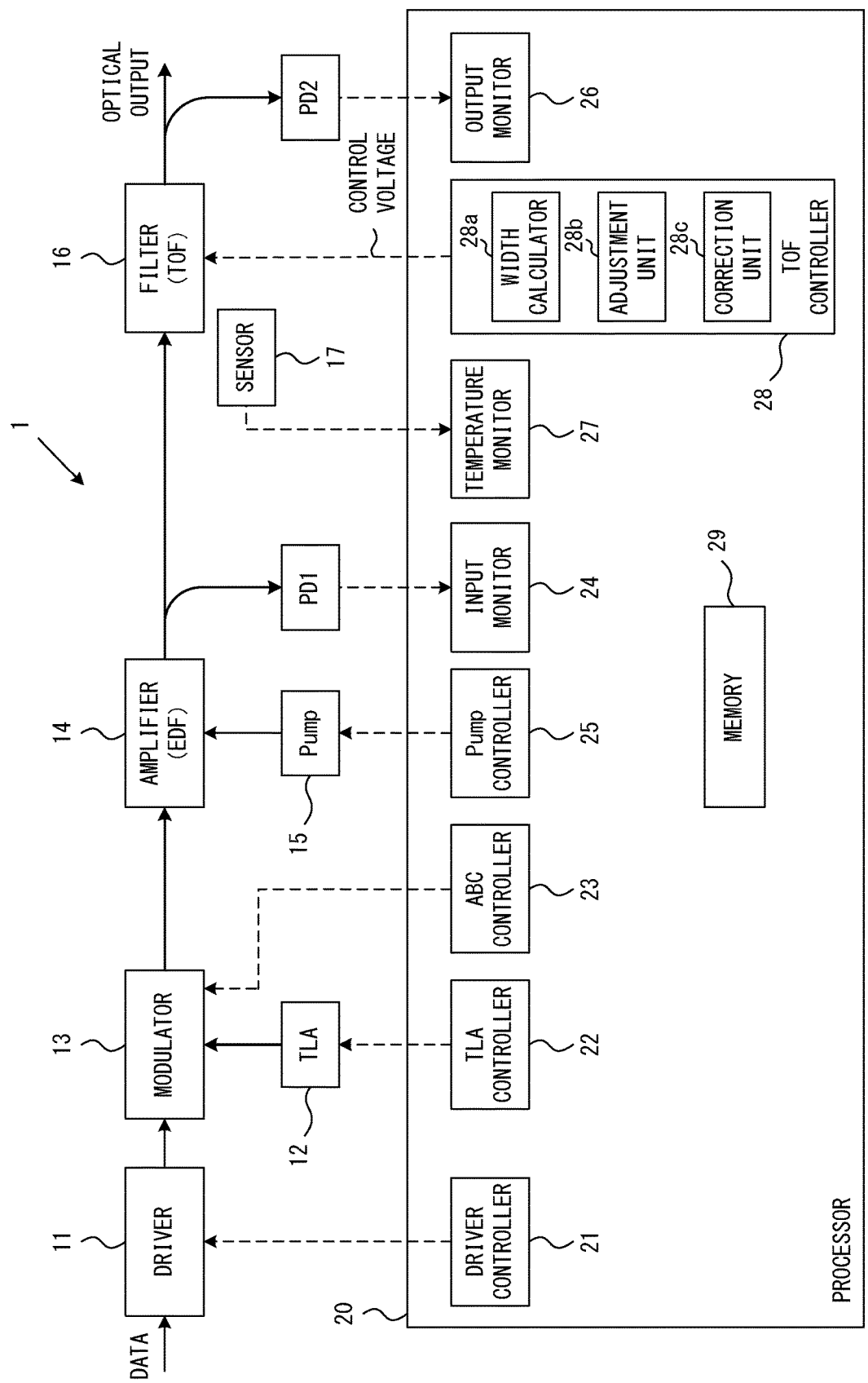
F I G. 1

FIG. 3A

| FREQUENCY (THz) | CONTROL VOLTAGE (V) |
|---|---|
| ⋮ | |
| 193.10 | 10.05 |
| 193.15 | 10.25 |
| 193.20 | 10.45 |
| 193.25 | 10.65 |
| 193.30 | 10.85 |
| 193.35 | 11.05 |
| 193.40 | 11.25 |
| ⋮ | |

FIG. 3B

| TEMPERATURE CHANGE (°C) | CORRECTION VALUE (V) |
|---|---|
| −3.0 | +0.24 |
| −2.0 | +0.16 |
| −1.0 | +0.08 |
| 0 | 0 |
| +1.0 | −0.08 |
| +2.0 | −0.16 |
| +3.0 | −0.24 |

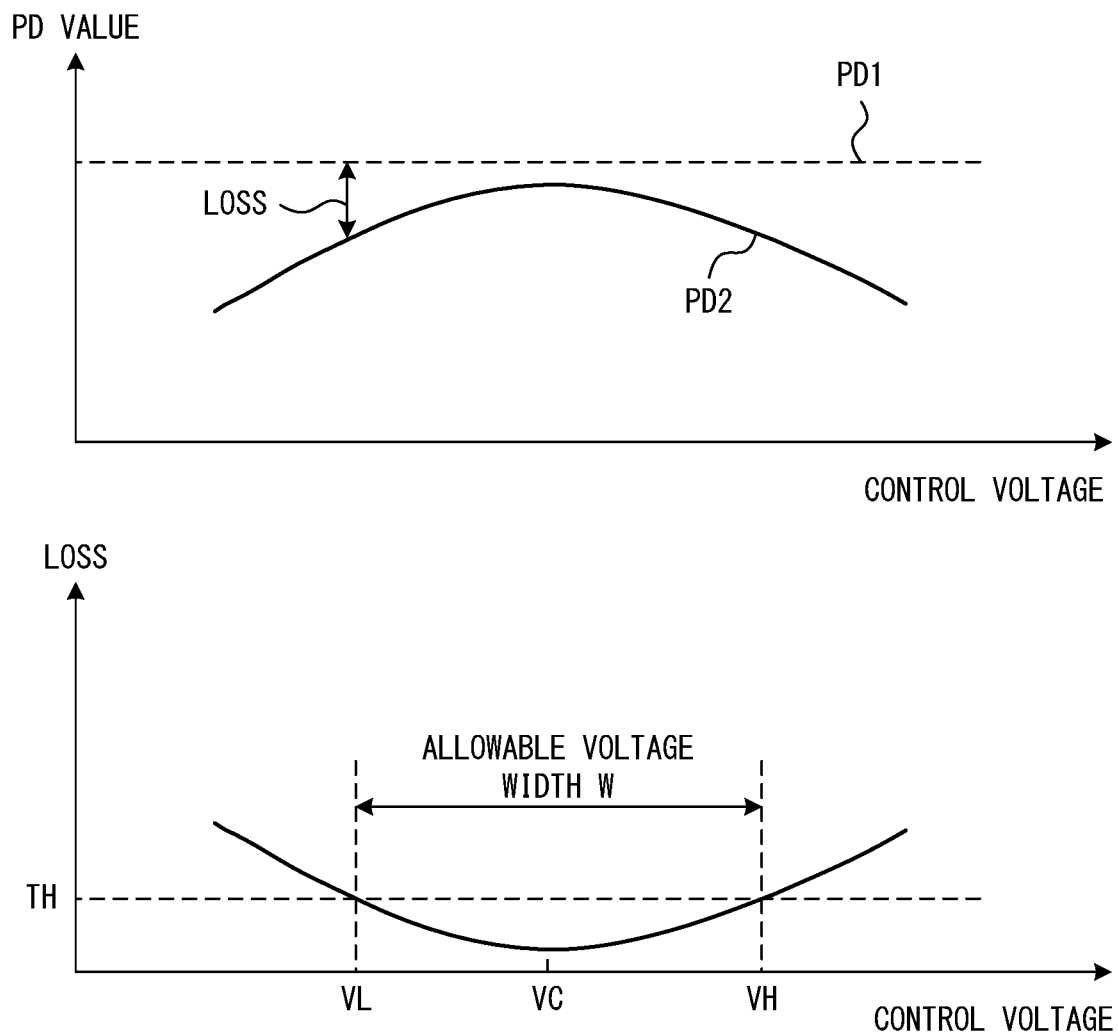
F I G. 4

OPTICAL TRANSMITTER AND CONTROL METHOD OF TUNABLE OPTICAL FILTER

CROSS-REFERENCE TO RELATED APPLICATION

This application is based upon and claims the benefit of priority of the prior Japanese Patent Application No. 2021-039962, filed on Mar. 12, 2021, the entire contents of which are incorporated herein by reference.

FIELD

The embodiments discussed herein are related to an optical transmitter and a method for controlling a tunable optical filter implemented in the optical transmitter.

BACKGROUND

An optical transmitter that achieves high power and high optical signal-to-noise ratio includes, for example, a laser light source, an optical modulator, an optical amplifier, and a tunable optical filter. In this case, the optical modulator modulates the output light of the laser light source with a data signal to generate an optical signal. The optical amplifier amplifies the optical signal generated by the optical modulator. The tunable optical is provided at the output side of the optical amplifier and is controlled to transmit light of a specified frequency.

The transmission frequency of the tunable optical filter is controlled by a feedback system that uses a dither signal, for example. In this case, the dither signal is superimposed on the control voltage that controls the transmission frequency of the tunable optical filter. The dither signal is realized by a low-frequency signal that is sufficiently low in frequency compared to the data rate. Here, when the dither signal is superimposed on the control voltage, the output light of the tunable optical filter will contain the frequency component of the dither signal. Therefore, the state of the tunable optical filter may be controlled by monitoring the frequency component of the dither signal included in the output light of the tunable optical filter. As an example, by minimizing the frequency component of the dither signal included in the output light of the tunable optical filter, the transmission frequency of the tunable optical filter approaches the target value.

A method for tracking the center wavelength of the transmission spectrum of a tunable wavelength filter to the wavelength of the received light has been proposed (for example, Japanese Laid-open Patent Publication No. 6-102555). Also, a method for controlling a tunable wavelength optical bandpass filter using the dither signal has been proposed (for example, Japanese Laid-open Patent Publication No. 2017-147622). Furthermore, a method for controlling the center wavelength of an optical tunable filter using an optical power detector installed at the input and output sides of the optical tunable filter has been proposed (for example, United States Patent Application Publication No. 2010/0142956).

In order to stabilize the output of the optical transmitter described above, it is preferable to constantly perform feedback control using the dither signal. However, if the dither signal is superimposed on the control voltage applied to the tunable optical filter, the output of the optical transmitter will fluctuate and the transmission characteristics will be degraded. For example, fluctuation (or tilt) of the optical spectrum of the output optical signal occurs, resulting in poor transmission characteristics. In recent years, the baud rate has become higher and the number of bits transmitted per symbol has become larger due to the larger capacity of transmitted data. Therefore, it is becoming more important to suppress the fluctuation of the output caused by the dither signal.

SUMMARY

According to an aspect of the embodiments, an optical transmitter includes: an optical modulator; a tunable optical filter provided on an output side of the optical modulator and configured to transmit light of a frequency corresponding to a control voltage; a temperature sensor configured to detect a temperature around the tunable optical filter; and a processor configured to detect an optical loss occurring in the tunable optical filter, calculate a width of a range of the control voltage in which the detected optical loss is smaller than a specified threshold, adjust the control voltage based on the temperature detected by the temperature sensor, and shift the control voltage by a specified amount that is larger than zero and smaller than or equal to a half of the calculated width of the range when the optical loss is larger than or equal to the threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an optical transmitter according to an embodiment of the present invention;

FIGS. 3A and 3B illustrate an example of control information for controlling a tunable optical filter;

FIG. 4 illustrates an example of a method for calculating an allowable voltage width;

DESCRIPTION OF EMBODIMENTS

Figure 2A:
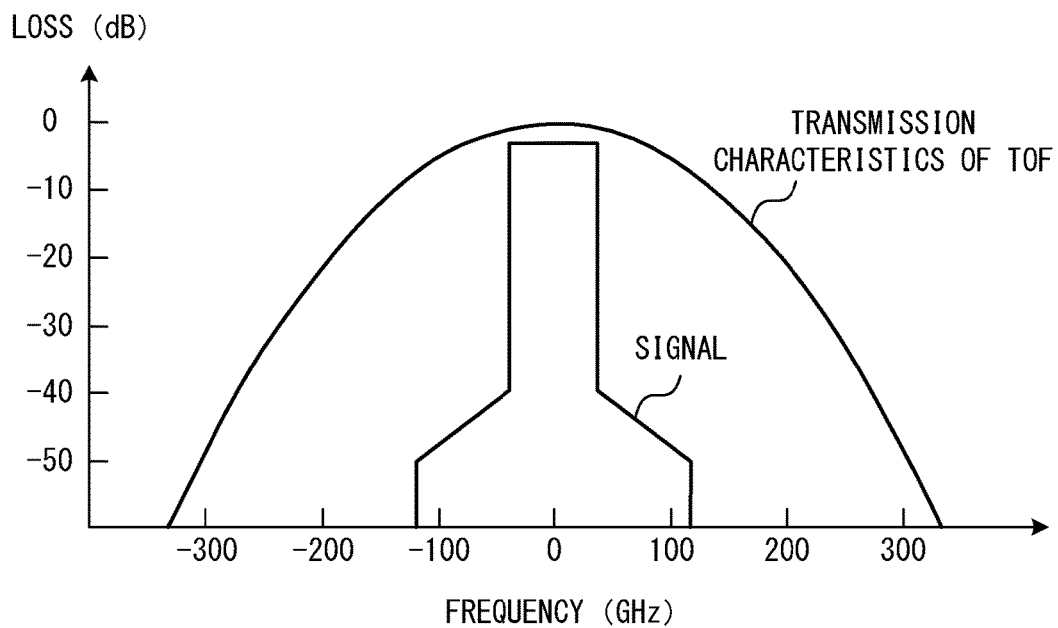
FIGS. 2A and 2B illustrate an example of the characteristics of a tunable optical filter.

FIG. 1 illustrates an example of an optical transmitter according to an embodiment of the present invention. An optical transmitter 1 according to an embodiment of the present invention is implemented, for example, in an optical transceiver. In this case, the optical transceiver is implemented in an optical transmission device.

The optical transmitter 1 includes a driver 11, a laser light source (TLA: Tunable Laser Assembly) 12, an optical modulator 13, an optical amplifier (EDF: Erbium-Doped Fiber) 14, a pump light source (Pump) 15, a tunable optical filter (TOF) 16, a photodetector PD1, a photodetector PD2, a temperature sensor 17, and a processor 20. The optical transmitter 1 may also be equipped with other elements or circuits that are not illustrated in FIG. 1.

The driver 11 generates a drive signal from transmission data according to a specified modulation scheme. The laser light source 12 generates continuous wave light of a frequency specified by the processor 20. The optical modulator 13 generates an optical signal by driving the continuous wave light generated by the laser light source 12 with the drive signal. The optical amplifier 14 amplifies the optical signal output from the optical modulator 13. The pump light source 15 supplies pump light to the optical amplifier 14.

The tunable optical filter 16 transmits light of the frequency specified by the processor 20. The photodetector PD1 converts the output light of the optical amplifier 14 into an electrical signal. That is, the photodetector PD1 converts the input light of the tunable optical filter 16 into an electrical signal. The photodetector PD2 converts the output light of the tunable optical filter 16 into an electrical signal. The photodetector PD1 and the photodetector PD2 are respectively realized by, for example a photodiode. The temperature sensor 17 detects the temperature around the tunable optical filter 16.

The processor 20 controls the operation of the optical transmitter 1 by executing a control program. In this example, the processor 20 provides the following functions by executing the control program: a driver controller 21, a TLA controller 22, an ABC controller 23, an input monitor 24, a pump controller 25, an output monitor 26, a temperature monitor 27, and a TOF controller 28. The control program may be stored in the processor 20 or outside the processor 20. The processor 20 also includes with a memory 29, which may be implemented in the processor 20 or connected to the processor 20.

The driver controller 21 controls the driver 11. For example, the driver 11 adjusts the waveform of the drive signal according to the instructions given by the driver controller 21. The TLA controller 22 controls the laser light source 12. For example, the laser light source 12 generates continuous wave light of the frequency specified by the TLA controller 22. The ABC controller 23 controls the bias of the optical modulator 13.

The input monitor 24 monitors the intensity of the output light of the optical amplifier 14 using the output signal of the photodetector PD1. That is, the input monitor 24 can monitor the intensity of the input light of the tunable optical filter 16. The pump controller 25 controls the intensity of the output light of the optical amplifier 14 by adjusting the intensity of the pump light output from the pump light source 15. As an example, the pump controller controls the pump light source 15 so that the intensity of the output light of the optical amplifier 14 is maintained at a target level. At this time, the pump controller 25 may refer to the result of the monitoring by the input monitor 24.

The output monitor 26 uses the output signal of the photodetector PD2 to monitor the intensity of the output light of the tunable optical filter 16. The temperature monitor 27 uses the output signal of the temperature sensor 17 to monitor the temperature around the tunable optical filter 16.

The TOF controller 28 controls the transmission frequency of the tunable optical filter 16. At this time, the TOF controller 28 controls the transmission frequency of the tunable optical filter 16 based on the results of the monitoring by the input monitor 24, the output monitor 26, and the temperature monitor 27. For example, the TOF controller 28 can control the transmission frequency of the tunable optical filter 16 based on the temperature near the tunable optical filter 16 by referring to the monitoring results of the temperature monitor 27. Also, the TOF controller 28 can control the transmission frequency of the tunable optical filter 16 based on the optical loss generated in the tunable optical filter 16 by referring to the monitoring results of the input monitor 24 and the output monitor 26.

The photodetector PD1, the input monitor 24, the photodetector PD2, and the output monitor 26 are examples of the detector that detects the optical loss occurred in the tunable optical filter 16. In addition, in the case where the intensity of the output light of the optical amplifier 14 is maintained at a target level, the detector that detects the optical loss may be realized using the photodetector PD2 and the output monitor 26.

The TOF controller 28 includes a width calculator 28a, an adjustment unit 28b, and a correction unit 28c. The adjustment unit 28b adjusts the transmission frequency of the tunable optical filter 16 based on the temperature near the tunable optical filter 16, as described above. The width calculator 28a and the correction unit 28c will be explained later.

The TOF controller 28 calculates the control voltage to control the transmission frequency of the tunable optical filter 16. A digital-to-analog converter and a voltage generator circuit that are not illustrated in the drawing are provided between the TOF controller 28 and the tunable optical filter 16. In this case, the TOF controller 28 outputs a digital signal representing the calculated control voltage. The digital-to-analog converter converts this digital signal into an analog signal. The voltage generator circuit generates the control voltage represented by the analog signal. This control voltage is then applied to the tunable optical filter 16. Here, it is assumed that the transmission frequency of the tunable optical filter 16 changes according to the applied control voltage. Therefore, the TOF controller 28 can control the transmission frequency of the tunable optical filter 16 by adjusting the control voltage.

Figure 2B:
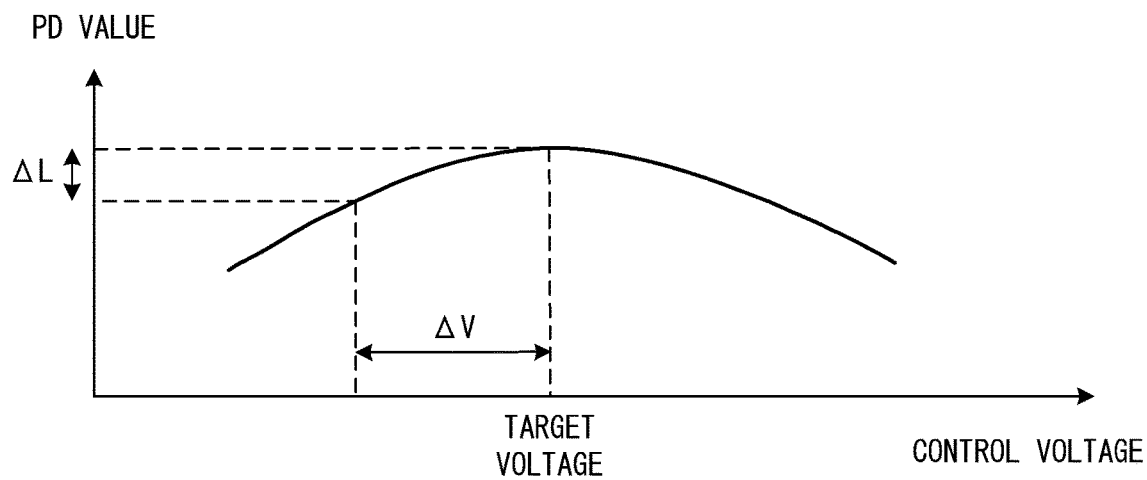

FIGS. 2A and 2B illustrate an example of the characteristics of the tunable optical filter 16. The tunable optical filter 16 is controlled so that the center frequency of the transmission band matches the center frequency of the spectrum of the optical signal, as illustrated in FIG. 2A. Here, the center frequency of the transmission band of the tunable optical filter 16 changes depending on the control voltage. Therefore, the TOF controller 28 adjusts the control voltage so that the center frequency of the transmission band matches the center frequency of the spectrum of the optical signal.

FIG. 2B illustrates the relationship between the control voltage and the intensity of the output light of the tunable optical filter 16. The frequency and intensity of the input light of the tunable optical filter 16 are assumed to be constant. The intensity of the output light of the tunable optical filter 16 is detected by the photodetector PD2 illustrated in FIG. 1.

When the control voltage is adjusted to the target voltage, the optical loss in the tunable optical filter 16 is minimum.

That is, the intensity of the output light of the tunable optical filter 16 is maximum. In the example in FIG. 2B, when the control voltage is shifted by ΔV from the target voltage, the optical loss in the tunable optical filter 16 increases by ΔL. Therefore, as the control voltage shifts from the target voltage, the intensity of the output light of the tunable optical filter 16 decreases.

FIGS. 3A and 3B illustrate an example of control information for controlling the tunable optical filter 16. FIG. 3A illustrates an example of a control voltage/frequency conversion table. The control voltage/frequency conversion table contains information that represents the relationship between the control voltage and the center frequency of the transmission band of the tunable optical filter 16. Therefore, when the center frequency of the transmission band of the tunable optical filter 16 is specified, the TOF controller 28 can determine the control voltage to be applied to the tunable optical filter 16 by referring to the control voltage/frequency conversion table. For example, when the optical transmitter 1 transmits an optical signal with a center frequency of 193.20 THz, the center frequency of the transmission band of the tunable optical filter 16 is required to be set to 193.20 THz. In this case, by referring to the control voltage/frequency conversion table, the control voltage=10.45V is obtained.

FIG. 3B illustrates an example of the temperature change/correction value conversion table. The temperature change/correction value conversion table contains information that represents the relationship between the temperature around the tunable optical filter 16 and the correction value of the control voltage. The transmission characteristics of the tunable optical filter 16 depend on the temperature. In this case, even if the optical loss of the tunable optical filter 16 is minimized in the initial setting, if the temperature near the tunable optical filter 16 changes afterwards, the optical loss of the tunable optical filter 16 may increase. Therefore, the optical transmitter 1 has a function to compensate for the degradation of the transmission characteristics of the tunable optical filter 16 caused by temperature changes. "TEMPERATURE CHANGE" in FIG. 3B represents the difference from the reference temperature (e.g., 25° C.) in the initial setting. When the adjustment sequence described below is performed periodically, "TEMPERATURE CHANGE" may represent the change from the temperature when the previous adjustment sequence was performed.

The TOF controller 28 monitors the temperature around the tunable optical filter 16 using the temperature sensor 17. When this temperature changes, the TOF controller 28 obtains the corresponding correction value by referring to the temperature change/correction value conversion table. For example, when the temperature around the tunable optical filter 16 increases by 2 degrees, the TOF controller 28 obtains the correction value=−0.16V by referring to the temperature change/correction value conversion table. In this case, the TOF controller 28 decreases the control voltage by 0.16V. As a result, the degradation of the transmission characteristics of the tunable optical filter 16 caused by the temperature change is compensated, and the state of small optical loss is maintained.

The information to be stored in the control voltage/frequency conversion table and the temperature change/correction value conversion table is provided by the vendor of the tunable optical filter 16, for example. Alternatively, the information stored in the control voltage/frequency conversion table and the temperature change/correction value conversion table may be obtained by measurement.

Next, the procedure to control the tunable optical filter 16 in the optical transmitter 1 is explained. It is assumed that the control voltage/frequency conversion table in FIG. 3A and the temperature change/correction value conversion table in FIG. 3B are stored in a memory (e.g., the memory 29) that is accessible by the processor 20.

Advance Preparation

The TOF controller 28 calculates the allowable voltage width before starting to control the tunable optical filter 16. Here, a threshold representing the allowable loss is used in the calculation of the allowable voltage width.

FIG. 4 illustrates a method for calculating the allowable voltage width. In this example, the output light intensity of the optical amplifier 14 is kept at a constant level. That is, the intensity of the input light of the optical filter 16 is constant. The intensity of the input light of the tunable optical filter 16 may be referred to as "PD1" in the following description. In addition, the intensity of the output light of the tunable optical filter 16 may be referred to as "PD2."

The TOF controller 28 determines the control voltage corresponding to the target frequency. The target frequency corresponds to the frequency of the continuous wave light output from the laser light source 12, for example. The TOF controller 28 corrects the control voltage based on the temperature around the tunable optical filter 16. In the following description, the temperature around the tunable optical filter 16 detected by the temperature sensor 17 may be referred to as the "monitor temperature."

As an example, it is assumed that the target frequency is 193.25 THz and the monitor temperature is 27.5° C. In this case, by first referring to the control voltage/frequency conversion table in FIG. 3A, "10.65V" is obtained as the control voltage. The monitor temperature is 2.5 degrees higher than the reference temperature (in this case, 25° C.). Therefore, by referring to the temperature change/correction value conversion table in FIG. 3B, the correction value is calculated as in the equation below.

Correction value=(−0.16)+{(−0.24)−(−0.16)}×0.5=−0.20

The correction value is added to the control voltage obtained from the control voltage/frequency conversion table to obtain the control voltage VC to be applied to the tunable optical filter 16. That is, "10.45V" is obtained as the control voltage VC.

The TOF controller 28 applies the control voltage VC to the tunable optical filter 16. When the control voltage VC is applied, the optical loss of the tunable optical filter 16 is almost minimized, as illustrated in FIG. 4.

The width calculator 28a of the TOF controller 28 sweeps the control voltage while monitoring the optical loss of the tunable optical filter 16. For example, the width calculator 28a shifts the control voltage by 0.1V and calculates the optical loss for each control voltage. Here, the optical loss of the tunable optical filter 16 is calculated by the following equation using the intensity PD1 of the input light of the tunable optical filter 16 and the intensity PD2 of the output light of the tunable optical filter 16.

Optical loss=10×log 10(PD1÷PD2)

The width calculator 28a detects the control voltage at which the optical loss of the tunable optical filter 16 matches the threshold TH illustrated in FIG. 4. Specifically, the width calculator 28a decreases the control voltage from VC and detects the control voltage (minimum control voltage VL) when the optical loss of the tunable optical filter 16 is equal to the threshold TH. Also, the width calculator 28a increases the control voltage from VC and detects the control voltage (maximum control voltage VH) when the optical loss of the tunable optical filter 16 is equal to the threshold TH. Then, the difference between the minimum control voltage VL and the maximum control voltage VH is calculated to obtain the allowable voltage width W. The calculated allowable voltage width W is stored in the memory 29.

The threshold TH represents the maximum value of the optical loss of the tunable optical filter (that is, the allowable loss) allowed in the optical transmitter 1. Therefore, the allowable voltage width W represents the variation range of the control voltage in which the optical loss of the tunable optical filter 16 becomes smaller than the allowable loss.

Feedforward Control

Figure 5:
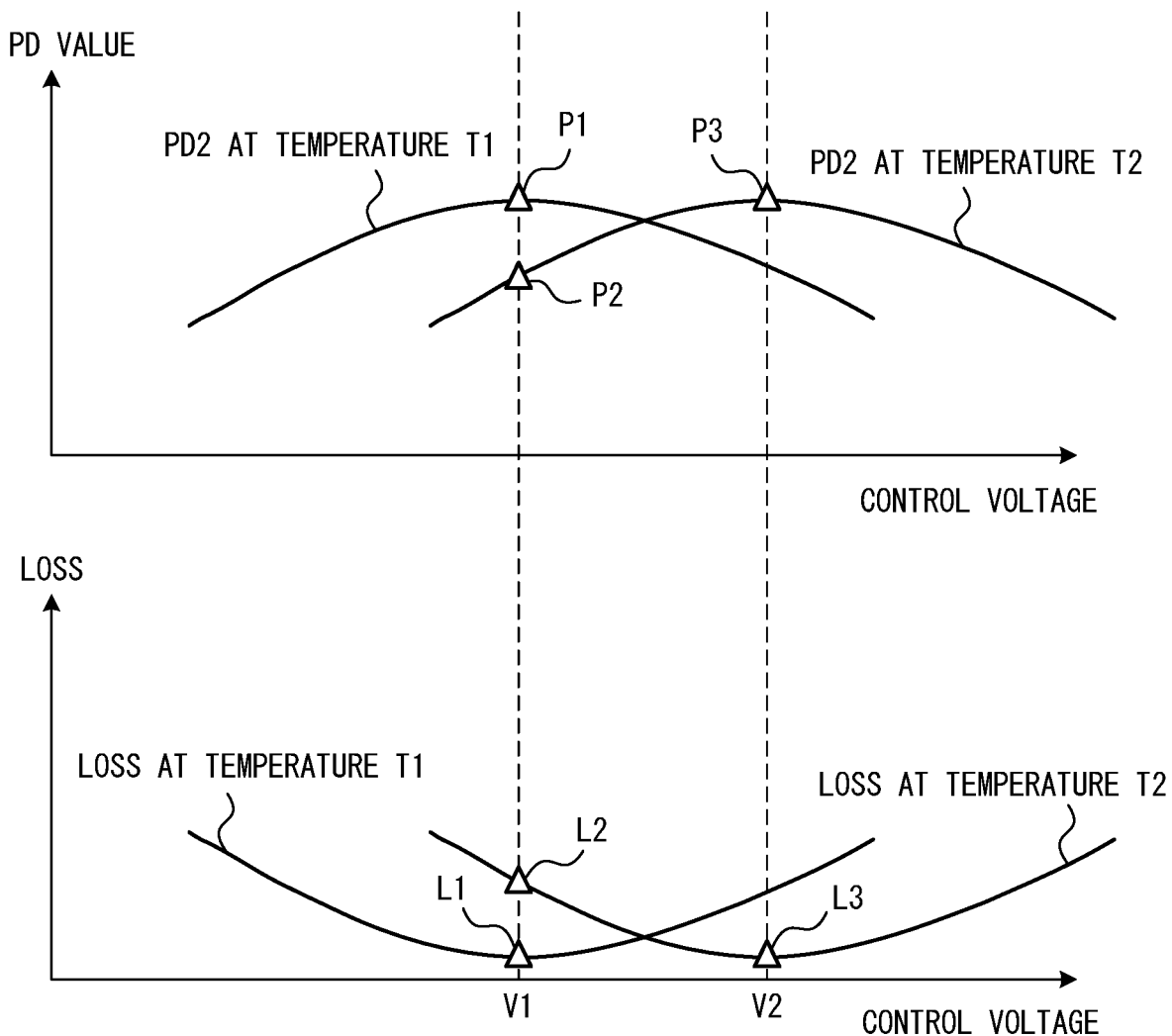
FIG. 5 illustrates an example of feedforward control of control voltage based on temperature.

FIG. 5 illustrates an example of feedforward control of the control voltage based on temperature. In this example, the intensity of the input light of the tunable optical filter 16 (that is, PD1) is assumed to be constant. In addition, it is assumed that the adjustment unit 28b of the TOF controller 28 periodically executes an adjustment sequence to adjust the control voltage. In addition, it is assumed that the monitor temperature is T1 when the last adjustment sequence is executed. In the previous adjustment sequence, the adjustment unit 28b adjusts the control voltage to V1. As a result, the intensity of the output light of the tunable optical filter 16 is P1. Also, the optical loss of the tunable optical filter 16 is L1.

After this, it is assumed that the temperature around the tunable optical filter 16 decreases, and the monitor temperature at the time of execution of the next adjustment sequence is T2. Here, the transmission characteristic of the tunable optical filter 16 changes depending on the temperature. Therefore, if the control voltage is kept at V1, the intensity of the output light of the tunable optical filter 16 decreases from P1 to P2, and the optical loss of the tunable optical filter 16 increases from L1 to L2. Therefore, the adjustment unit 28b adjusts the control voltage to compensate for the increase in optical loss caused by the temperature change. Specifically, the new control voltage is calculated based on the following equation.

New control voltage=Old control voltage+Correction value Correction value=($TC-TP$)×$\Delta C$ TC represents current monitor temperature, TP represents previous monitor temperature, and $\Delta C$ represents a change in correction value per unit temperature.

In the example in FIG. 3B, the amount of change in the correction value per unit temperature is 0.08V. Therefore, for example, in the case in which the monitor temperature at the time of execution of the previous adjustment sequence was 26° C. and the current monitor temperature is 24.5° C., the correction value of "+0.12V" is obtained by multiplying "1.5° C." by "0.08V/degree". In this case, the new control voltage V2 is obtained by adding "+0.12" to the old control voltage V1.

In this way, the adjustment unit 28b updates the control voltage from V1 to V2. The updated control voltage is then applied to the tunable optical filter 16. Therefore, the intensity of the output light of the tunable optical filter 16 goes from P2 to P3, and the optical loss in the tunable optical filter 16 decreases from L2 to L3. The adjustment unit 28b periodically executes the adjustment sequence described above. Thus, the small optical loss is maintained.

Error Correction

As described above, the adjustment unit 28b periodically executes feedforward control based on temperature to adjust the control voltage. However, in this feedforward control, an approximate calculation is performed using the temperature change/correction value conversion table shown in FIG. 3B. Therefore, an error may occur in each adjustment sequence.

Figure 6:
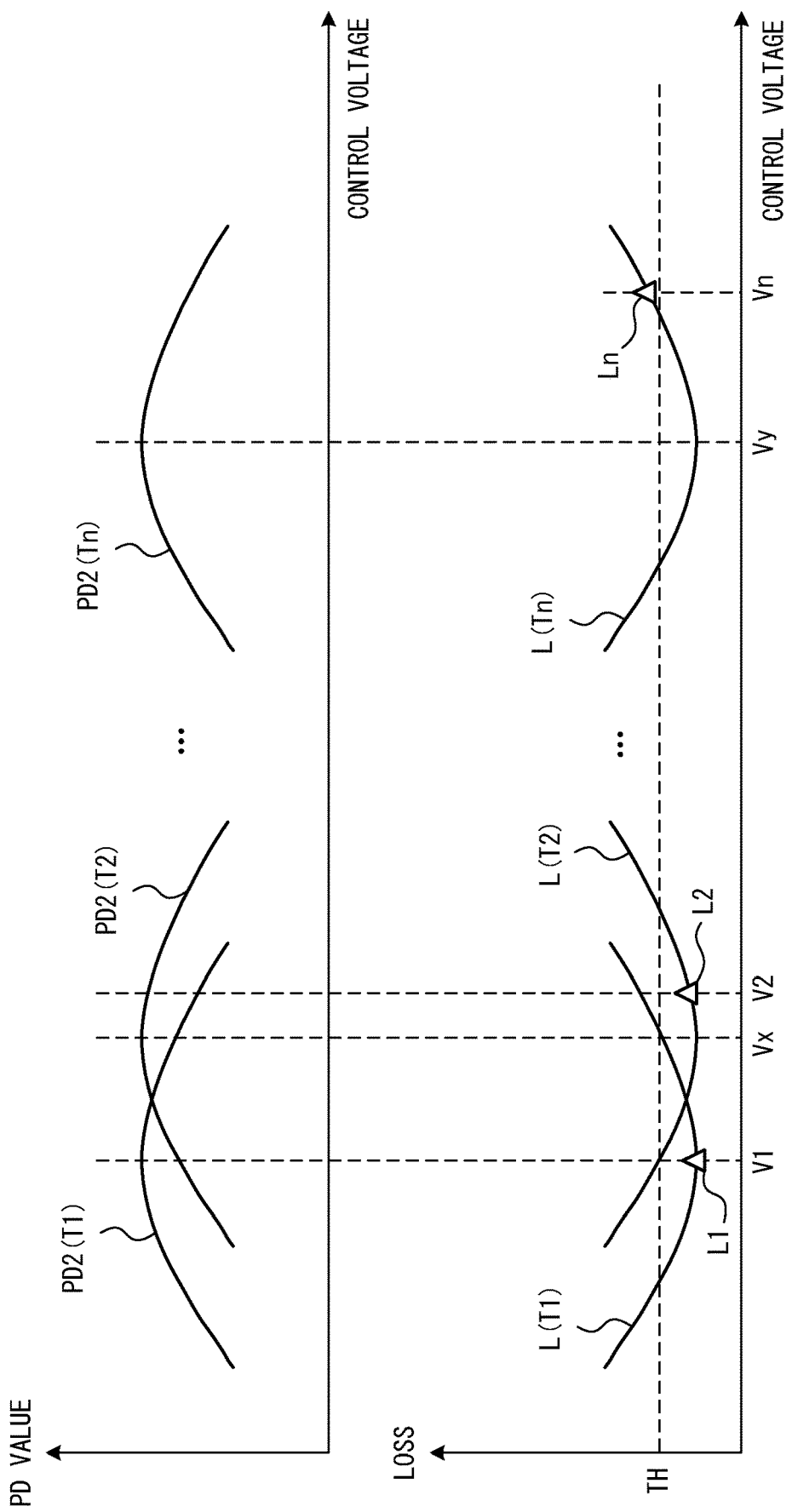
FIG. 6 illustrates an example of a case in which optical loss increases due to error accumulation in feedforward control.

FIG. 6 illustrates an example of a case in which optical loss increases due to the accumulation of errors in feedforward control. In this example, the temperature at the time of execution of each adjustment sequence is assumed to vary from T1, T2, . . . , Tn. For example, it is assumed that the monitor temperature is T1 at the time of the initial setting of the optical transmitter 1. The transmission characteristic of the tunable optical filter 16 represented by the intensity of the output light of the photodetector PD2 is PD2(T1). And the optical loss characteristic of the tunable optical filter 16 is represented by L(T1). In this case, when the control voltage V1 is applied, the optical loss in the tunable optical filter 16 is L1.

The temperature at the time of execution of the next adjustment sequence is T2. In this case, the transmission characteristic of the tunable optical filter 16 changes from PD2(T1) to PD2(T2), and the optical loss characteristic of the tunable optical filter 16 changes from L(T1) to L(T2). At this time, to minimize the optical loss of the tunable optical filter 16, the control voltage should be adjusted to Vx. That is, it is preferable that when the monitor temperature changes from T1 to T2, the correction value is Vx−V1. However, in feedforward control, an error may occur. In this example, the correction value calculated based on the monitor temperature and the temperature change/correction value conversion table is larger than the ideal correction value. As a result, the calculated result of the new control voltage is V2.

After this, the adjustment unit 28b periodically executes the adjustment sequence described above. At this time, it is assumed that a similar error occurs in each adjustment sequence. That is, in each adjustment sequence, the calculated correction value is larger than the ideal correction value. In this case, the error will accumulate, and eventually the optical loss of the tunable optical filter 16 after adjusting the control voltage will become larger than the allowable loss (that is, threshold TH).

In the example in FIG. 6, the monitor temperature is Tn when the n-th adjustment sequence is executed. At this time, the transmission characteristic is PD2(Tn) and the optical loss characteristic is L(Tn). When the control voltage is adjusted to Vn by executing the adjustment sequence, the optical loss Ln of the tunable optical filter 16 becomes larger than the threshold TH. Note that Vy represents the ideal control voltage when the monitor temperature is Tn.

In the case in which the correction value of the control voltage in each adjustment sequence contains errors as described above, the optical loss of the tunable optical filter 16 may become larger than the threshold TH due to the accumulation of the errors. Therefore, the optical transmitter 1 includes a function to solve or mitigate this problem.

Figure 7:
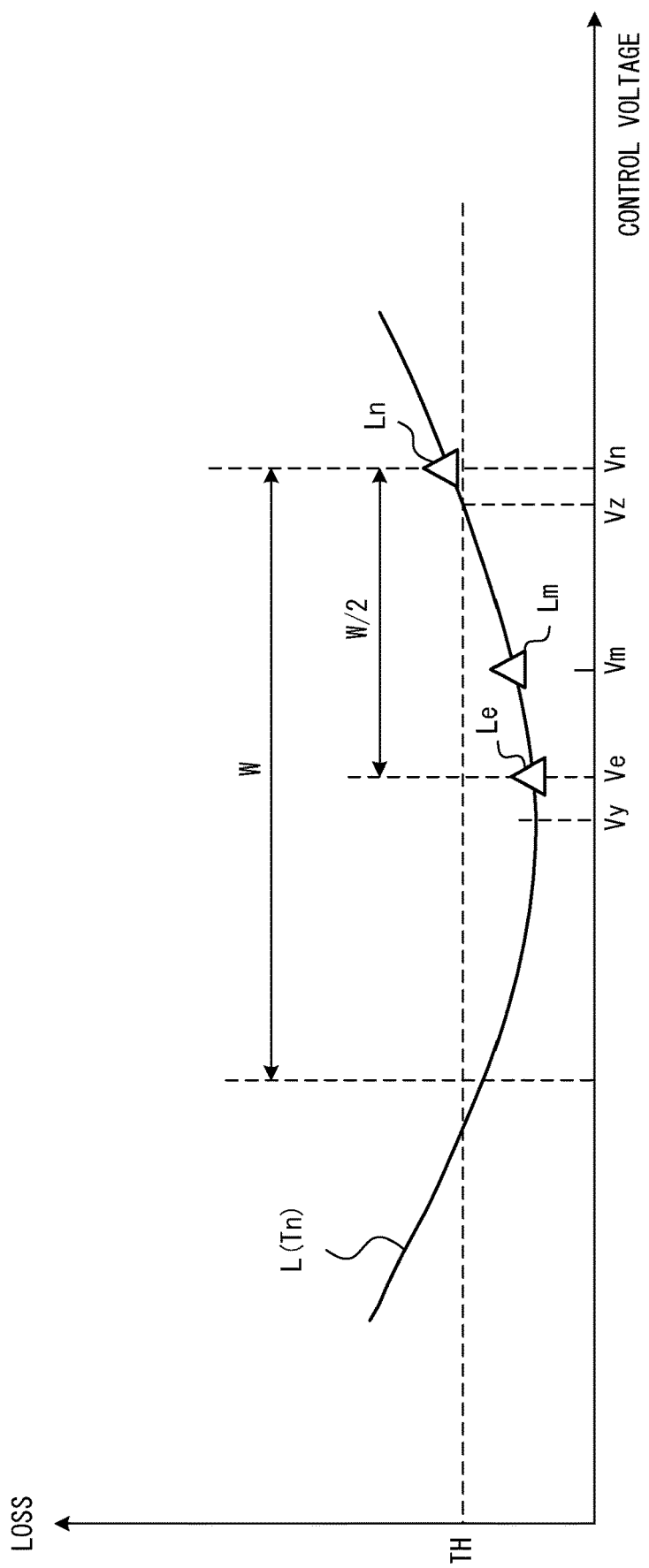
FIG. 7 illustrates an example of a method for correcting an error in the control voltage that occurs in the case illustrated in FIG. 6.

FIG. 7 illustrates an example of a method for correcting an error in the control voltage that occurs in the case in FIG. 6. In this example, the control voltage has been adjusted to Vm in the previous adjustment sequence. In the current adjustment sequence, the control voltage is adjusted to Vn. At this time, the optical loss in the tunable optical filter 16 changes from Lm to Ln. That is, with the adjustment of the control voltage, the optical loss of the tunable optical filter 16 will exceed the threshold TH. In this case, the correction unit 28c of the TOF controller 28 corrects the control voltage based on the allowable voltage width W described with reference to in FIG. 4. The allowable voltage width W has been calculated in advance by the width calculator 28a and has been stored in the memory 29.

In the example in FIG. 7, it is assumed that when the monitor temperature is Tn and the control voltage is set to Vy, the optical loss of the tunable optical filter 16 becomes minimum. That is, Vy is a target voltage when the monitor temperature is Tn. In addition, it is assumed that when the control voltage is set to Vz, the optical loss of the tunable optical filter 16 increases to the threshold TH.

When the optical loss of the tunable optical filter 16 exceeds the threshold TH due to an adjustment of the control voltage, the correction unit 28c shifts the control voltage by one-half of the allowable voltage width W. Here, it is assumed that the error generated in each adjustment sequence is small, and the accumulation of errors causes the optical loss of the tunable optical filter 16 to exceed the threshold TH. In this case, the difference between the control voltage Vn when the optical loss exceeds the threshold TH by executing the adjustment sequence and the control voltage (Vz in FIG. 7) at which the optical loss of the tunable optical filter 16 corresponds to the threshold TH is considered to be small. On the other hand, the difference between the control voltage at which the optical loss of the tunable optical filter 16 corresponds to the threshold TH (Vz in FIG. 7) and the target control voltage at which the optical loss of the tunable optical filter 16 is minimum (Vy in FIG. 7) is approximately half of the allowable voltage width W. Therefore, if the control voltage is shifted by one-half of the allowable voltage width W when the optical loss exceeds the threshold TH with the adjustment sequence, the corrected control voltage will be set at approximately the center of the control voltage range in which the optical loss is less than the threshold TH. That is, the corrected control voltage becomes close to the target control voltage Vy. As a result, the optical loss of the tunable optical filter 16 becomes small.

If the control voltage after shifting the control voltage is within the range W in FIG. 7, the optical loss becomes smaller than the case where the control voltage is not shifted. Therefore, the amount by which the control voltage is shifted is not limited to one-half of the allowable voltage width W, but may be a prescribed amount determined within a range greater than zero and equal to or smaller than one-half of the allowable voltage width W. However, in this example, the amount of shift of the control voltage by the correction unit 28c is illustrated as one-half of the allowable voltage width W.

In the example in FIG. 7, when the control voltage is set to Vn in the adjustment sequence, the optical loss exceeds the threshold TH. Then, the correction unit 28c shifts the control voltage Vn by W/2. As a result, the control voltage is corrected to Ve. At this time, the corrected control voltage Ve is obtained according to the following equation (1).

$$Ve = Vn + \{(W/2) \times FFP \times (-1)\} \quad (1)$$

FFP represents the polarity of the feedforward control in the adjustment sequence. That is, FFP represents whether the control voltage has been increased or decreased by the feedforward control. Specifically, FFP is "+1" when the control voltage has been increased by feedforward control, and FFP is "−1" when the control voltage has been decreased by feedforward control. In the example in FIG. 7, the adjustment unit 28b increases the control voltage from Vm to Vn, and therefore, "FFP=+1" is obtained. When the optical loss exceeds the threshold TH due to the adjustment of the control voltage in the adjustment sequence, it is necessary to shift the control voltage in the opposite direction of the change of the control voltage in the adjustment sequence in order to make the optical loss smaller than the threshold TH. Therefore, FFP is multiplied by "−1" in the above equation (1).

As a result, a control voltage Ve that is close to the target control voltage Vy is obtained. Therefore, the optical loss (Le in FIG. 7) of the tunable optical filter 16 is almost minimized. After this, the normal adjustment sequence is repeated by the adjustment unit 28b.

Figure 8:
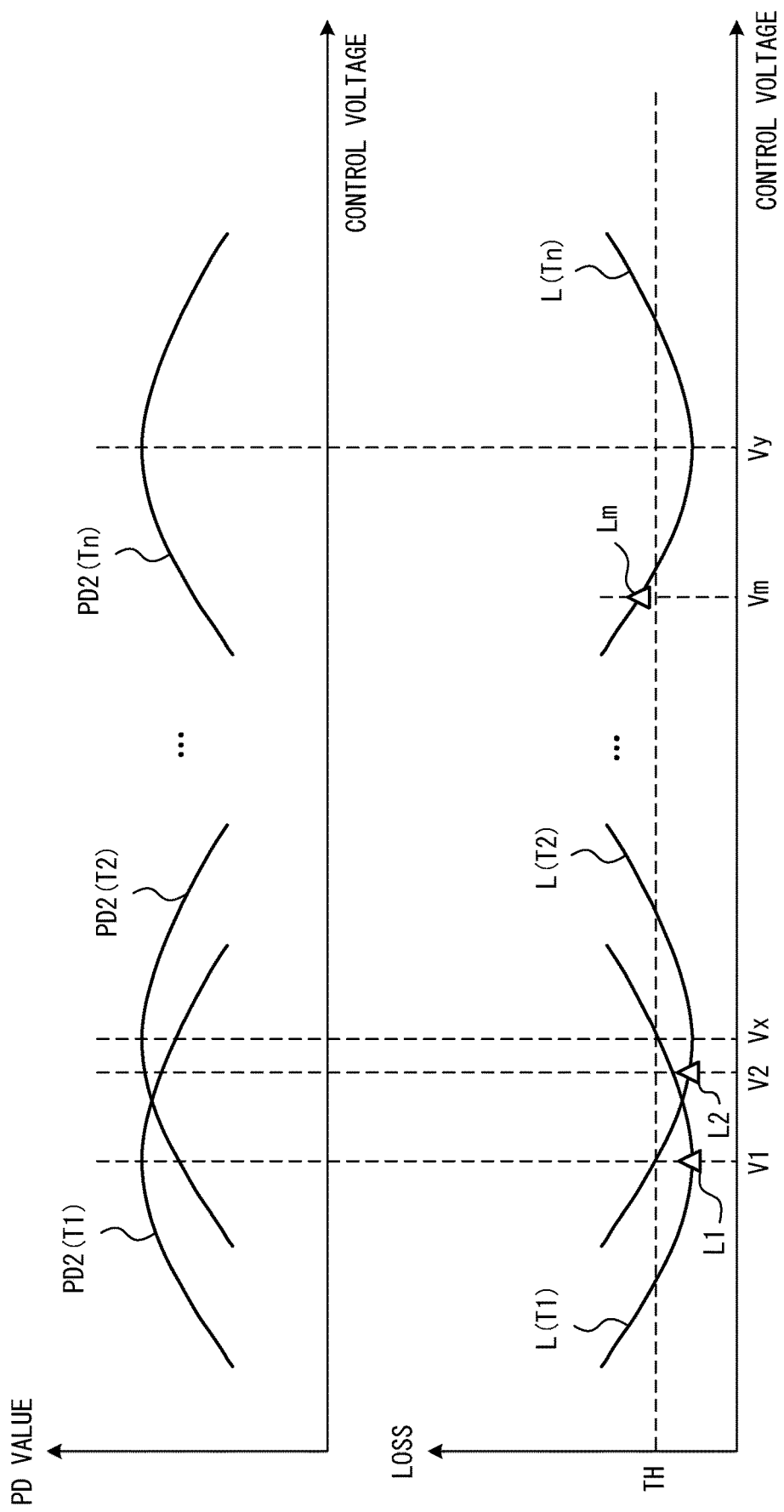
FIG. 8 illustrates another example of a case in which optical loss increases due to error accumulation in feedforward control.

FIG. 8 illustrates another example of a case in which the optical loss increases due to the accumulation of errors in the feedforward control; as in the case in FIG. 6, the temperature at the time of execution of each adjustment sequence varies from T1, T2, . . . , Tn. However, in the case in FIG. 8, the shift width of the control voltage by each adjustment sequence is insufficient.

For example, in the case in which the monitor temperature changes from T1 to T2 and the optical loss characteristic in the tunable optical filter 16 changes from L(T1) to L(T2), in order to minimize the optical loss, the control voltage should be adjusted to Vx. That is, it is preferrable that the correction value is "Vx−V1". However, in this example, the correction value calculated by the adjustment unit 28b is smaller than the ideal correction value. As a result, the new control voltage is calculated as V2.

After this, the adjustment unit 28b periodically executes the adjustment sequence described above. At this time, a similar error occurs in each adjustment sequence. Then, if the temperature continues to increase, due to the accumulation of errors, the optical loss of the tunable optical filter 16 becomes larger than the allowable loss (that is, threshold TH).

In the example in FIG. 8, at the start of the n-th adjustment sequence, the control voltage has been set to Vm by the previous adjustment sequence. On the other hand, since the monitor temperature has changed to Tn, the transmission characteristic is PD2(Tn) and the optical loss characteristic is L(Tn). In this case, the optical loss Lm corresponding to the control voltage Vm becomes larger than the threshold TH. Note that Vy represents the ideal control voltage when the monitor temperature is Tn.

Figure 9:
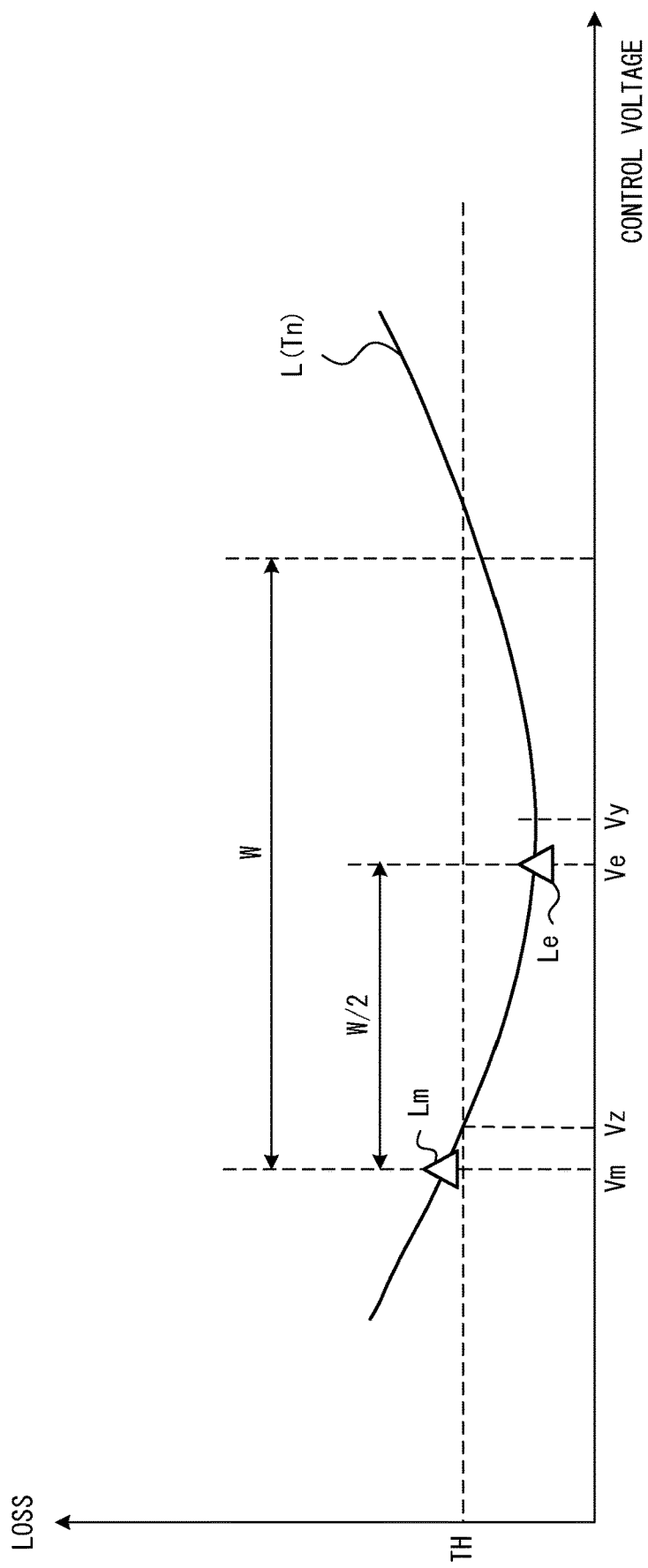
FIG. 9 illustrates another example of a method for correcting an error in the control voltage that occurs in the case illustrated in FIG. 8.

FIG. 9 illustrates another example of a method for correcting the error in the control voltage that occurs in the case in FIG. 8. In this example, the control voltage has been adjusted to Vm in the previous adjustment sequence. Then, at the start of the current adjustment sequence, the optical loss in the tunable optical filter 16 is measured. At this time, the optical loss Lm has exceeded the threshold TH. In this case, the correction unit 28c shifts the control voltage by W/2.

However, in the cases in FIG. 8 and FIG. 9, the optical loss has already exceeded the threshold TH before the current adjustment sequence is executed. Therefore, in this case, the correction unit 28c obtains the control voltage Ve according to the following equation (2).

$$Vc = Vn + \{(W/2) \times FFP\} \quad (2)$$

In this case, since the optical loss exceeds the threshold TH before the control voltage is adjusted by the adjustment sequence, the FFP is determined based on the change in the monitor temperature. For example, according to the temperature change/correction value conversion table in FIG. 3B, if the current monitor temperature is higher than the monitor temperature when the previous adjustment sequence was executed, the correction value is negative. Therefore, when the current monitor temperature is higher than the monitor temperature at the time of execution of the previous adjustment sequence, FFP is "−1". On the other hand, if the current monitor temperature is lower than the monitor temperature at the time of execution of the previous adjustment sequence, FFP is "+1".

As a result, a control voltage Ve that is close to the target control voltage Vy is obtained. Therefore, the optical loss of the tunable optical filter 16 is almost minimized. After this, the normal adjustment sequence is repeated by the adjustment unit 28b.

When the period of performing the adjustment sequence is not long, the difference between Vz and Vn in FIG. 7 and the difference between Vz and Vm in FIG. 9 are small enough. If the control voltage is shifted by W/2 when the optical loss exceeds the threshold TH, the corrected control voltage will be set at almost the center of the control voltage range in which the optical loss is smaller than the threshold TH. That is, the control voltage after the correction is close to the target control voltage Vy. As a result, the optical loss of the tunable optical filter 16 is almost minimized.

In the above example, the correction unit 28c shifts the control voltage by W/2 when the optical loss exceeds the threshold TH, but the present invention is not limited to this configuration. For example, the difference between the control voltage when the optical loss exceeds the threshold TH and the control voltage that minimizes the optical loss may be slightly larger than W/2. In the case in FIG. 7, the difference between the control voltage Vn when the optical loss exceeds the threshold TH and the control voltage Vy that minimizes the optical loss is larger than W/2. Also, in the case in FIG. 9, the difference between the control voltage Vm when the optical loss exceeds the threshold TH and the control voltage Vy that minimizes the optical loss is larger than W/2. Therefore, when the optical loss exceeds the threshold TH, the correction unit 28c may shift the control voltage by a little larger than W/2. Furthermore, even if the control voltage is shifted by a little less than W/2 when the optical loss exceeds the threshold TH, the optical loss may be sufficiently reduced. That is, if the control voltage is shifted by about W/2 when the optical loss exceeds the threshold TH, a sufficient effect is obtained in suppressing the optical loss.

The threshold TH is determined in advance. Here, the smaller the threshold TH is, the smaller the optical loss becomes. However, since the correction of the control voltage is frequently performed, the intensity of the output light fluctuates. That is, the output light contains a dither component. On the other hand, if the threshold TH is large, the dither signal is suppressed, but the optical loss of the tunable optical filter tends to increase. Therefore, it is preferable to determine the threshold TH appropriately, taking these factors into consideration.

Figure 10:
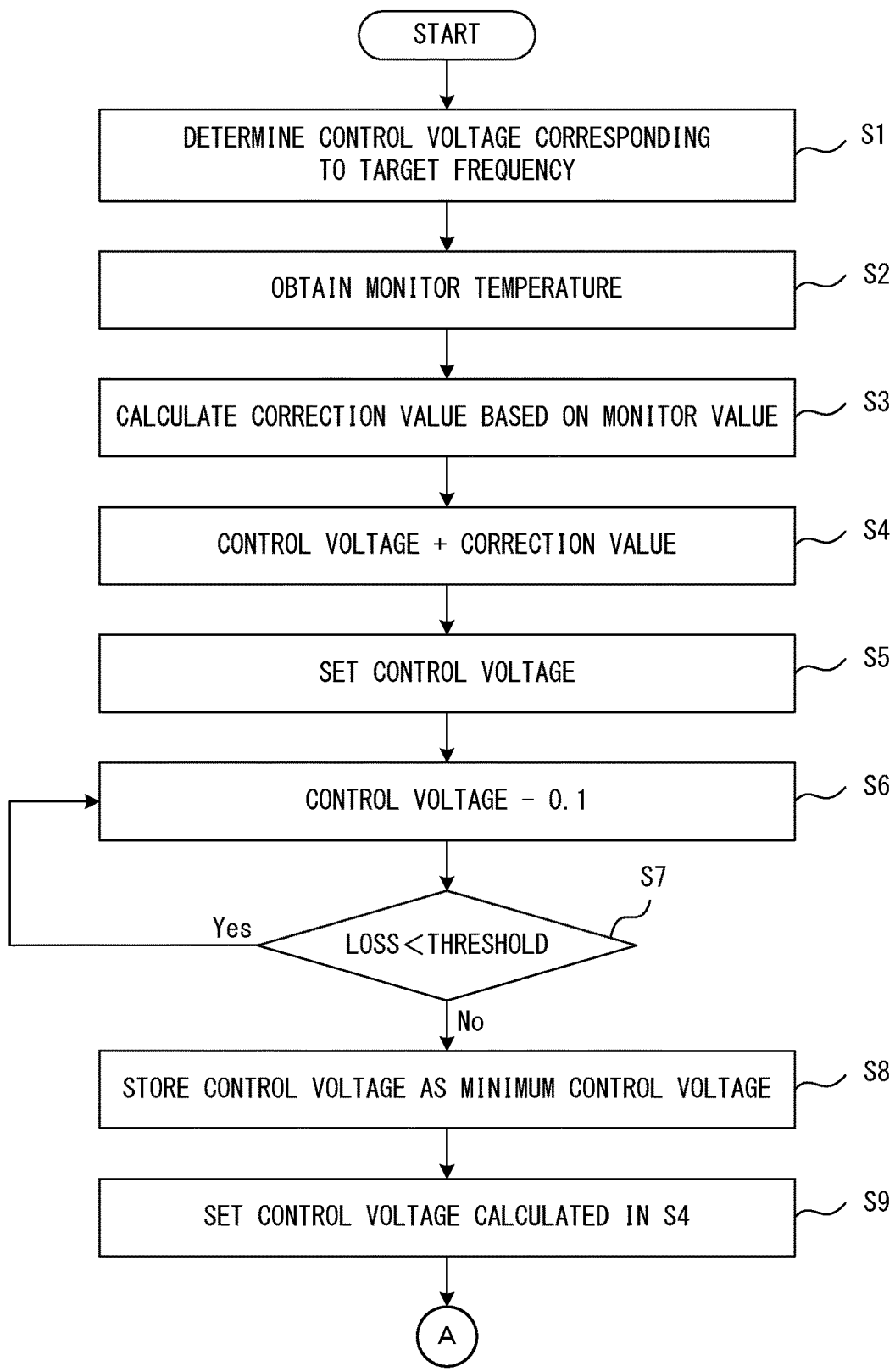
FIGS. 10 and 11 are a flowchart illustrating an example of advance preparation.
Figure 11:
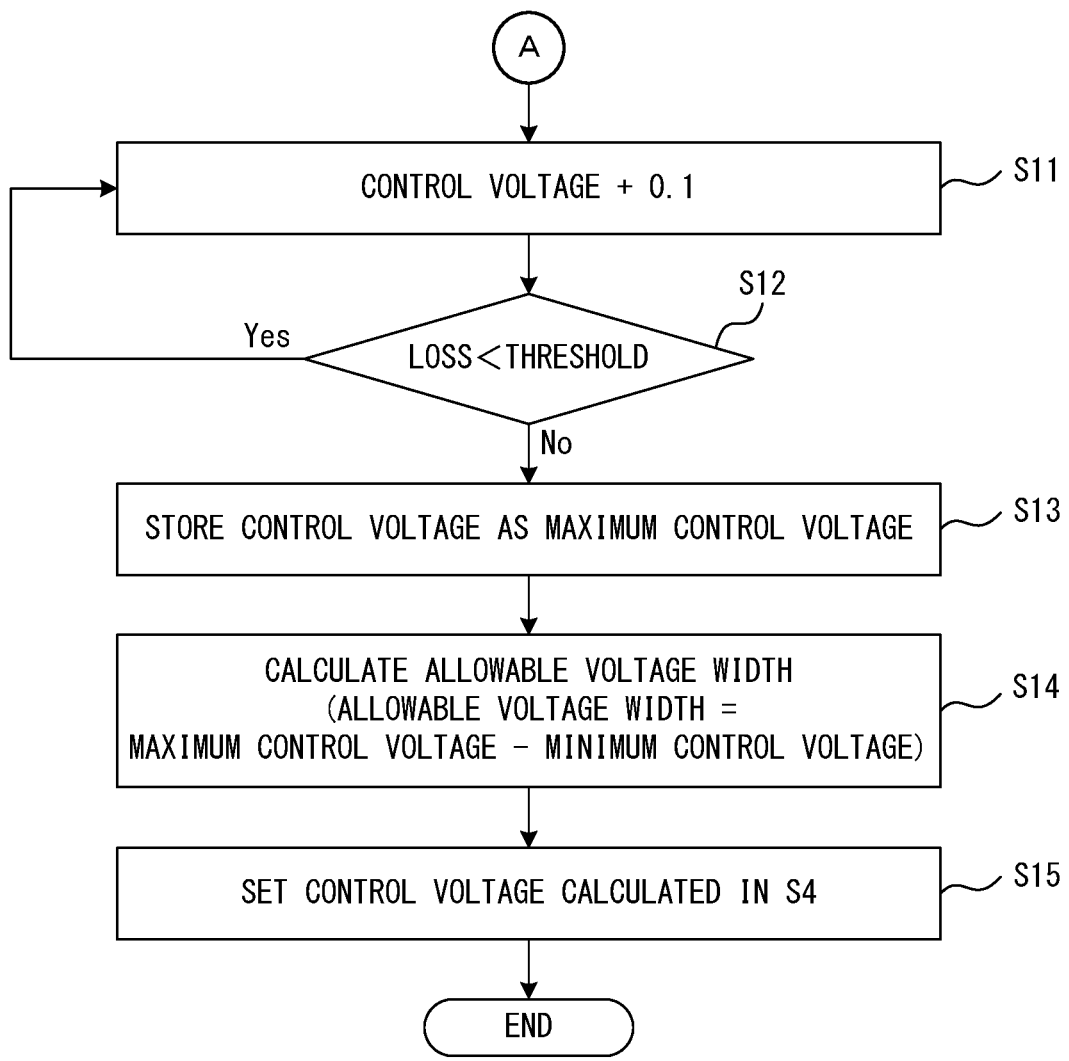

FIG. 10 and FIG. 11 are a flowchart illustrating an example of an advance preparation. In the advance preparation, the allowable voltage width W in FIG. 4 is determined. It is assumed that the threshold TH is set in advance.

In S1, the TOF controller 28 refers to the control voltage/frequency conversion table in FIG. 3A to determine the control voltage corresponding to the target frequency. The target frequency is the carrier frequency of the optical signal transmitted by the optical transmitter 1 and is specified in advance.

In S2, the TOF controller 28 obtains the monitor temperature. The monitor temperature represents the temperature around the tunable optical filter 16. In addition, the monitor temperature is detected by the temperature sensor 17 and monitored by the temperature monitor 27.

In S3, the TOF controller 28 calculates the correction value based on the monitor temperature. The correspondence between the monitor temperature and the correction value is created in advance and stored in the temperature change/correction value conversion table in FIG. 3B. During the initial setting, the temperature change/correction value conversion table may be searched based on the difference between the monitor temperature and the reference temperature (for example, 25° C.)

In S4, the TOF controller 28 calculates the initial value of the control voltage to be set for the tunable optical filter 16. The initial value of the control voltage is obtained by adding the correction value calculated in S3 to the control voltage determined in S1. Then, in S5, the TOF controller 28 sets this control voltage to the tunable optical filter 16. After this, the width calculator 28a calculates the allowable voltage width W in S6 through S9 and S11 through S14.

In S6 and S7, the width calculator 28a compares the optical loss of the tunable optical filter 16 with the threshold TH while shifting the control voltage by "−0.1V". The optical loss is calculated from the output signal of the photodetector PD1 and the output signal of the photodetector PD2. When the intensity of the output light of the optical amplifier 14 is constant, the optical loss may be calculated from the output signal of the photodetector PD2. When the optical loss exceeds the threshold TH, the process of the width calculator 28a proceeds to S8.

In S8, the width calculator 28a stores the control voltage at the time when the optical loss becomes equal to or larger than the threshold TH as the minimum control voltage. After this, in S9, the width calculator 28a returns the control voltage to the value calculated in S4.

In S11 and S12, the width calculator 28a compares the optical loss of the tunable optical filter 16 with the threshold TH while shifting the control voltage by "+0.1V". In S13, the width calculator 28a stores the control voltage at the time when the optical loss becomes equal to or larger than the threshold TH as the maximum control voltage.

In S14, the width calculator 28a calculates the allowable voltage width W. The allowable voltage width represents the difference between the minimum control voltage obtained in S8 and the maximum control voltage obtained in S13. Then, the information representing the allowable voltage width W is stored in the memory 29. After this, in S15, the width calculator 28a returns the control voltage to the value calculated in S4.

Figure 12:
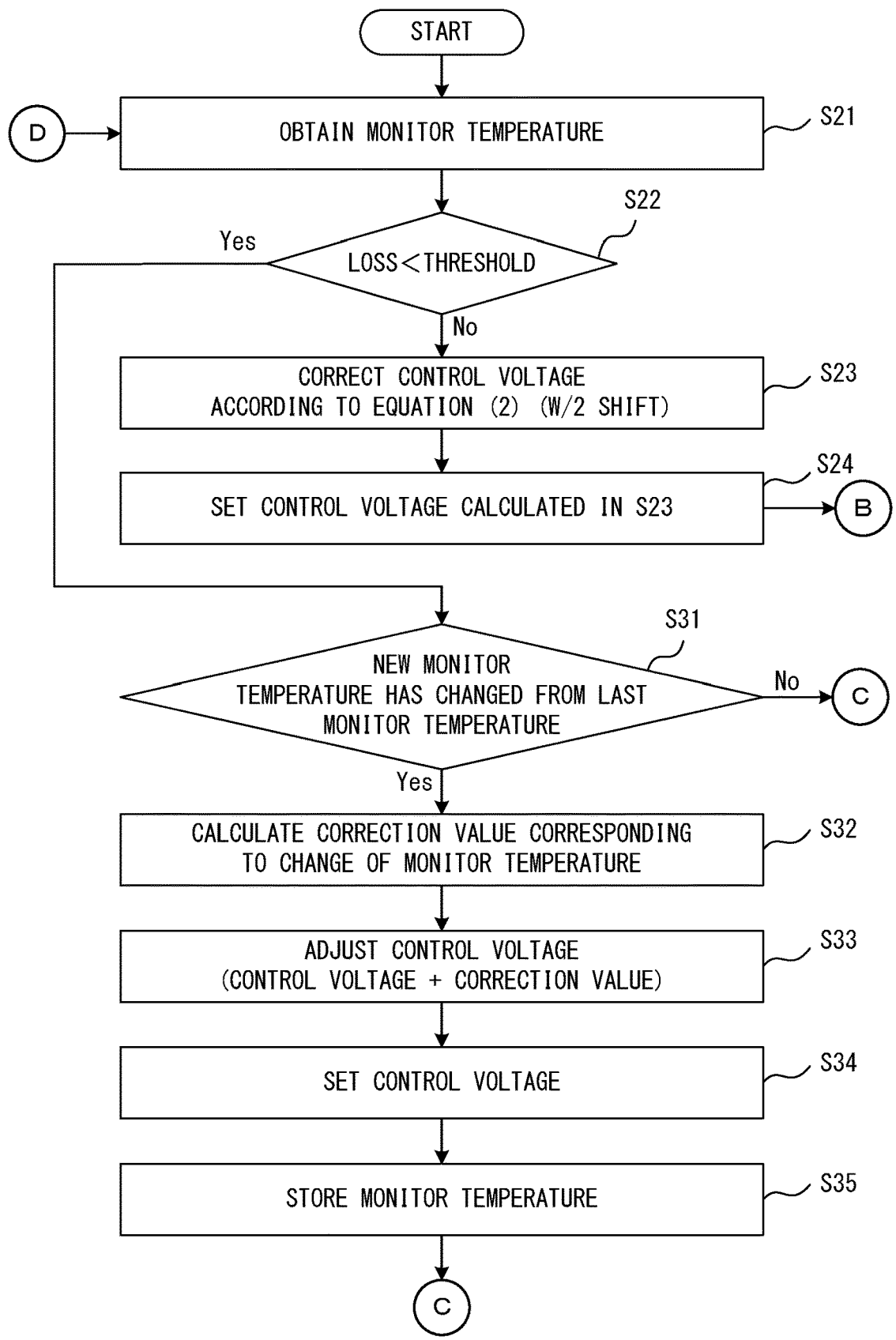
FIGS. 12 and 13 are a flowchart illustrating an example of feedforward control to determine the control voltage of a tunable optical filter.
Figure 13:
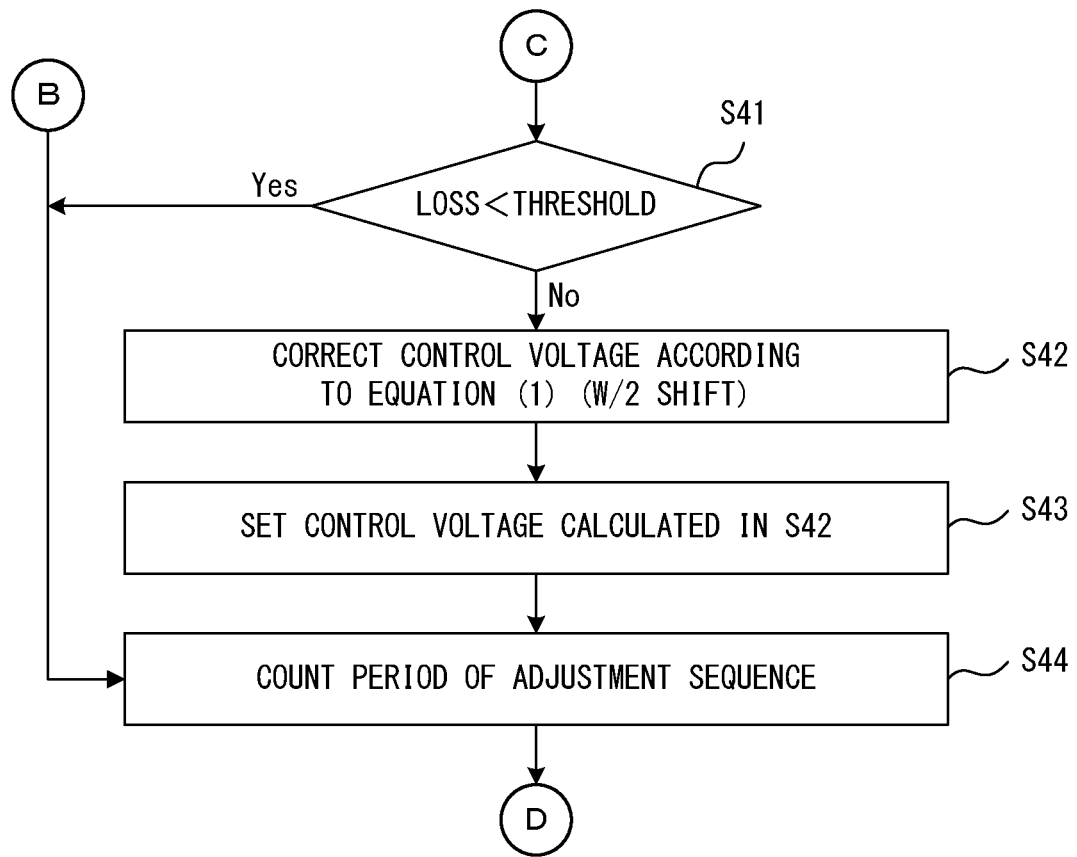

FIG. 12 and FIG. 13 are a flowchart illustrating an example of feedforward control to determine the control voltage of the tunable optical filter 16. The process of this flowchart is executed after the flowcharts in FIG. 10 and FIG. 11. That is, the allowable voltage width W has already been determined. In addition, the process of this flowchart is repeated at a predetermined period.

In S21, the adjustment unit 28b obtains the monitor temperature. The monitor temperature obtained in the previous adjustment sequence is stored in the memory 29 in FIG. 1, for example.

In S22, the adjustment unit 28b compares the optical loss generated in the tunable optical filter 16 with the threshold TH. When the optical loss is equal to or larger than the threshold TH, the process of the TOF controller 28 proceeds to S23. When the optical loss is smaller than the threshold TH, S23-S24 are skipped and the process of the TOF controller 28 proceeds to S31.

In S23, the correction unit 28c corrects the control voltage according to the equation (2) described above. In this case, the correction unit 28c shifts the control voltage by W/2 in the direction corresponding to the change in the monitor temperature. In S24, the TOF controller 28 sets the control voltage calculated in S23 to the tunable optical filter 16. After this, the process of the TOF controller 28 proceeds to S44.

In S31, the adjustment unit 28b compares the monitor temperature obtained in S21 with the monitor temperature obtained in the previous adjustment sequence. When the monitor temperature has changed, the process of the TOF controller 28 proceeds to S32. On the other hand, when the monitor temperature has not changed substantially, the process of the TOF controller 28 proceeds to S41. Here, "the monitor temperature has not changed substantially" includes the case in which the change in the monitor temperature is sufficiently small.

In S32, the adjustment unit 28b refers to the temperature change/correction value conversion table and calculates the correction value corresponding to the change in the monitor temperature. In S33, the adjustment unit 28b calculates the control voltage to be set for the tunable optical filter 16. This control voltage is obtained by adding the correction value calculated in S32 to the current control voltage. Then, in S34, the adjustment unit 28b sets this control voltage to the tunable optical filter 16. Also, in S35, the adjustment unit 28b stores the monitor temperature obtained in S21 in the memory 29.

In S41, the adjustment unit 28b compares the optical loss generated in the tunable optical filter 16 with the threshold TH. When the optical loss is equal to or larger than the threshold TH, the process of the TOF controller 28 proceeds to S42.

In S42, the correction unit 28c corrects the control voltage according to the equation (1) described above. At this time, the correction unit 28c shifts the control voltage by W/2 in the opposite direction of the change in control voltage in S32 to S34. Specifically, when the control voltage increases in S32 to S34, the correction unit 28c reduces the control voltage by W/2. When the control voltage decreases in S32 to S34, the correction unit 28c increases the control voltage by W/2. Next, in S43, the TOF controller 28 sets the control voltage calculated in S42 to the tunable optical filter 16. After this, the process of the TOF controller 28 proceeds to S44.

When the monitor temperature has not changed substantially (S31: Yes), the process of the TOF controller 28 proceeds to S41. However, when S31 is executed, the optical loss has already been determined to be smaller than the threshold TH (S22: Yes) before that. That is, in the case in which S41 is executed after S31 is executed, the determination in S41 is supposed to be "Yes." Therefore, when the monitor temperature has not changed substantially, S41 to S43 need not be executed.

S44 is provided to repeat the adjustment sequence at a predetermined period. That is, when the count corresponding to the predetermined period is completed, the process of the TOF controller 28 returns to S21.

Figure 14:
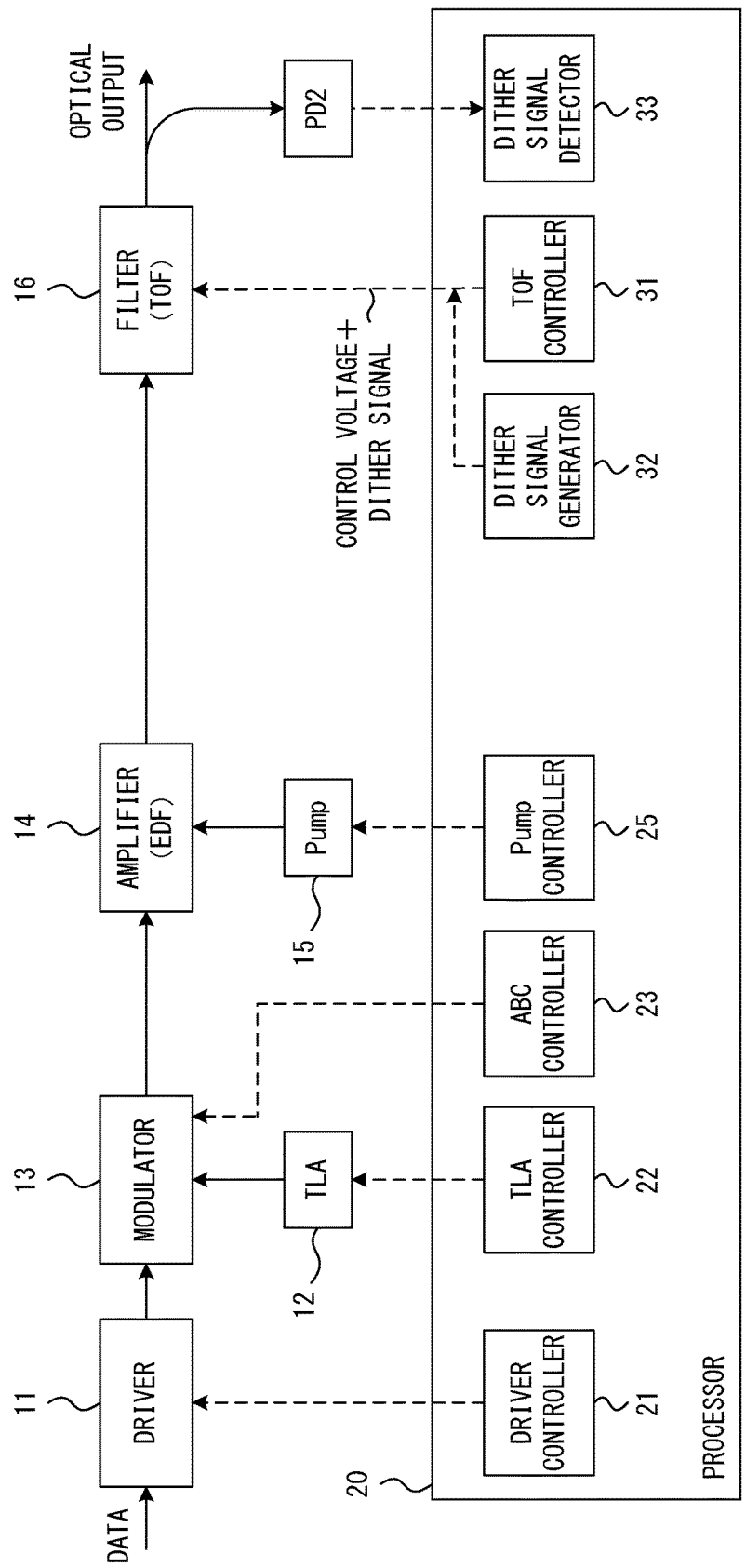
FIG. 14 illustrates an example of a configuration in which the control voltage is adjusted by feedforward.

FIG. 14 illustrates an example of a configuration in which the control voltage is adjusted by feedforward. In this example, a TOF controller 31 generates the control voltage that controls the tunable optical filter 16. A dither signal generator 32 generates a dither signal. The dither signal is a low frequency signal and is superimposed on the control voltage. Therefore, the output light of the tunable optical filter 16 contains the frequency component of the dither signal. A dither signal detector 33 detects the frequency component of the dither signal from the output light of the tunable optical filter 16. The TOF controller 31 adjusts the control voltage so that the detected frequency component of the dither signal becomes small. By this feedback system, the optical loss of the tunable optical filter 16 is minimized.

In this way, in feedback control, the output light of the optical transmitter contains the dither signal. As a result, the quality of the optical signal is degraded. In contrast, in the embodiment of the present invention, the tunable optical filter is controlled by feedforward without the use of the dither signal. Therefore, the quality of the optical signal transmitted from the optical transmitter is improved. In addition, in the embodiment of the present invention, when the optical loss of the tunable optical filter exceeds a threshold, the control voltage is forcibly corrected. Therefore, the optical loss is suppressed even when errors caused by the feedforward are accumulated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:
1. An optical transmitter comprising:
an optical modulator;
a tunable optical filter provided on an output side of the optical modulator and configured to transmit light of a frequency corresponding to a control voltage;
a temperature sensor configured to detect a temperature around the tunable optical filter; and
a processor configured to
 detect an optical loss occurring in the tunable optical filter,
 calculate a width of a range of the control voltage in which the detected optical loss is smaller than a specified threshold,
 adjust the control voltage based on the temperature detected by the temperature sensor, and
 shift the control voltage by a specified amount that is larger than zero and smaller than or equal to a half of the calculated width of the range when the optical loss is larger than or equal to the threshold.
2. The optical transmitter according to claim 1, wherein the processor shifts the control voltage by a half of the width.
3. The optical transmitter according to claim 1, wherein the processor shifts the control voltage by the specified amount in a direction corresponding to a direction in which the temperature around the tunable optical filter is increasing or decreasing.
4. The optical transmitter according to claim 1, wherein when the optical loss becomes larger than or equal to the threshold due to an adjustment of the control voltage that has been performed by the processor, the processor shifts the control voltage in a direction that is opposite to a direction in which the processor shifted the control voltage.
5. The optical transmitter according to claim 1, wherein the processor detects an optical loss occurring in the tunable optical filter by using a first photodetector configured to detect an intensity of input light of the tunable optical filter and a second photodetector configured to detect an intensity of output light of the tunable optical filter.

6. A control method for controlling a tunable optical filter that transmits light of a frequency corresponding to a control voltage, the control method comprising:
- detecting an optical loss occurring in the tunable optical filter;
- calculating a width of a range of the control voltage in which the detected optical loss is smaller than a specified threshold; and
- shifting the control voltage by a specified amount that is larger than zero and smaller than or equal to a half of the calculated width of the range when the optical loss is larger than or equal to the threshold.

* * * * *